United States Patent [19]

Janssen et al.

[11] 3,969,574

[45] July 13, 1976

[54] TUBULAR PLAYER ARM FOR AN OPTICAL RECORDING AND REPRODUCING DEVICE WITH DRIVE COIL AND TACHOGENERATOR COIL ON OTHER END

[75] Inventors: Peter Johannes Michiel Janssen; Gerard Eduard van Rosmalen, both of Eindhoven, Netherlands

[73] Assignee: U.S. Philips Corporation, New York, N.Y.

[22] Filed: Apr. 29, 1974

[21] Appl. No.: 464,852

[30] Foreign Application Priority Data
Feb. 28, 1974 Netherlands .................... 7402768

[52] U.S. Cl. .................. 178/6.6 R; 178/6.6 DD; 178/6.7 A; 179/100.3 V; 179/100.41 L; 360/77; 360/78
[51] Int. Cl.² .................. H04N 5/76; G11B 21/10; G11B 7/12; G11B 17/00
[58] Field of Search ............ 179/100.3 V, 100.41 L, 179/100.4 R; 178/6.7 A, 6.6 R, 6.6 DD; 360/75, 77, 78, 86, 97, 98, 99, 102, 104, 105, 106, 107, 109; 318/135; 310/13–19; 324/100

[56] References Cited
UNITED STATES PATENTS

| | | |
|---|---|---|
| 2,581,133 | 1/1952 | Niemann ............................ 324/100 |
| 3,391,255 | 7/1968 | Gregg .......................... 179/100.3 V |
| 3,521,092 | 7/1970 | Kalthoff ............................... 310/13 |
| 3,544,980 | 12/1970 | Applequist ......................... 360/106 |
| 3,576,454 | 3/1968 | Beach ................................. 310/16 |
| 3,833,769 | 9/1974 | Compaan et al ............ 179/100.3 V |
| 3,842,197 | 10/1974 | Broussaud et al. .......... 179/100.3 V |

*Primary Examiner*—Raymond F. Cardillo, Jr.
*Attorney, Agent, or Firm*—Frank R. Trifari; Simon L. Cohen

[57] ABSTRACT

A device for writing information in a disk-shaped record carrier, and/or for reproducing the recorded information, the transducer being radially movable relative to the record carrier, which transducer is disposed on a tubular member, which at its one end is provided with a drive coil and at its other end with a tachometer coil, which coils are movable in an air gap of a stationary magnet system.

6 Claims, 3 Drawing Figures

TUBULAR PLAYER ARM FOR AN OPTICAL RECORDING AND REPRODUCING DEVICE WITH DRIVE COIL AND TACHOGENERATOR COIL ON OTHER END

The invention relates to a device for writing in or reproducing information from a rotating disk-shaped record carrier, the transducer being capable of moving substantially radially relative to the record carrier.

Such devices are known for cutting and/or playing back phonograph records. The cutter is then driven by a lead screw. For writing information on video disks, especially optical video disks, the accuracy of such a lead screw is inadequate and the entire construction is not sufficiently rigid. In order to mitigate these drawbacks the cutter, according to the invention, is disposed on a tubular member which at either side is provided with a coil. Each of the coils is movable in an air gap of a stationary magnet system. One of the coils is a drive coil and the other a tacho-generator coil. Control is substantially improved owing to the rigid connection between the drive coil and the tacho-generator coil, because the two coils cannot move relative to each other. As a result, a very rigid assembly is obtained which may be moved at any arbitrary speed.

According to an embodiment of a device according to the invention the magnet systems consist of a core which may be hollow and which is provided at one end with a preferably cylindrical pole shoe, which in conjunction with a pole plate disposed around it constitutes the air gap. A magnetic connection is provided between the plate and the other end of the core.

The core may consist of a permanent-magnet material, while the magnetic connection then consists of a soft-magnet material, the reverse also being possible. The pole shoe and thus the tubular member may be cylindrical but may also be of different shape, such as triangular or square. With these last embodiments it is at the same time possible to prevent the tubular member from rotating about its axis.

In order to prevent static friction-sliding friction effects it is advantageous according to a further embodiment of the invention to provide the pole shoe and/or the pole plate with ducts which terminate in the air gap, through which a pressurised gas or fluid may be forced out. As a result, the tubular member is borne by a gas or liquid film which, in itself, may be very rigid.

The magnetic systems generally have a greater diameter than the tubular member, so that the transducer must be connected to the tubular member via a relatively long intermediate piece. In order to avoid these drawbacks, it is possible according to a different embodiment of the device according to the invention to extend the tubular member through one of the magnet systems and to dispose the transducer at its end, so that a rigid assembly is obtained and the record carrier may readily be exchanged.

In an apparatus for recording and reproducing an optical video disk it is advantageous to dispose a reflecting element in the axis of the tubular member. A lens system in the tubular member provides light which is projected axially through the hollow core of one of the magnet systems onto the transducer. The reflecting element, and the lens system if present, is then rigidly connected with the transducer to the tubular member and may consist of a normal mirror or a prism.

The invention will now be described in more detail with reference to the drawings, in which.

Figure 1A:
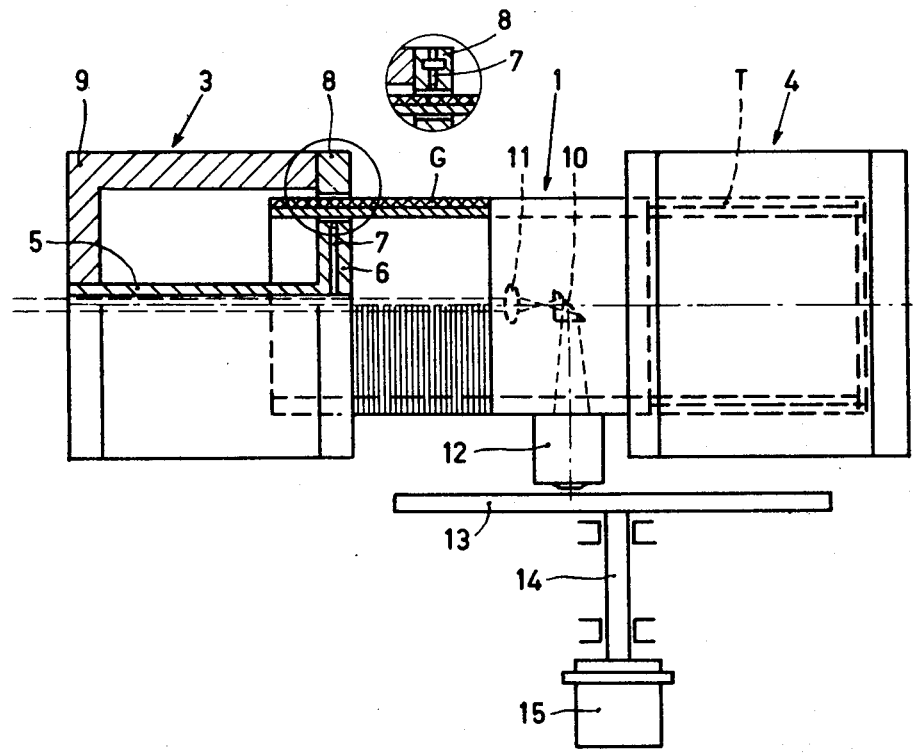
FIG. 1 shows a side elevation of an embodiment of the device.
Figure 3:
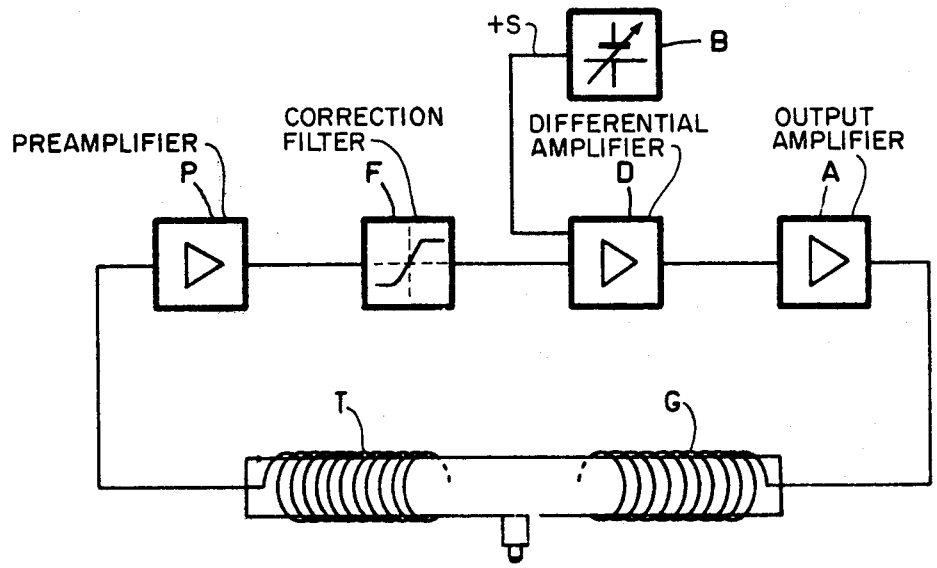
FIG. 3 shows a circuit diagram of a control system that may be used for driving of the tubular member.
Figure 2:
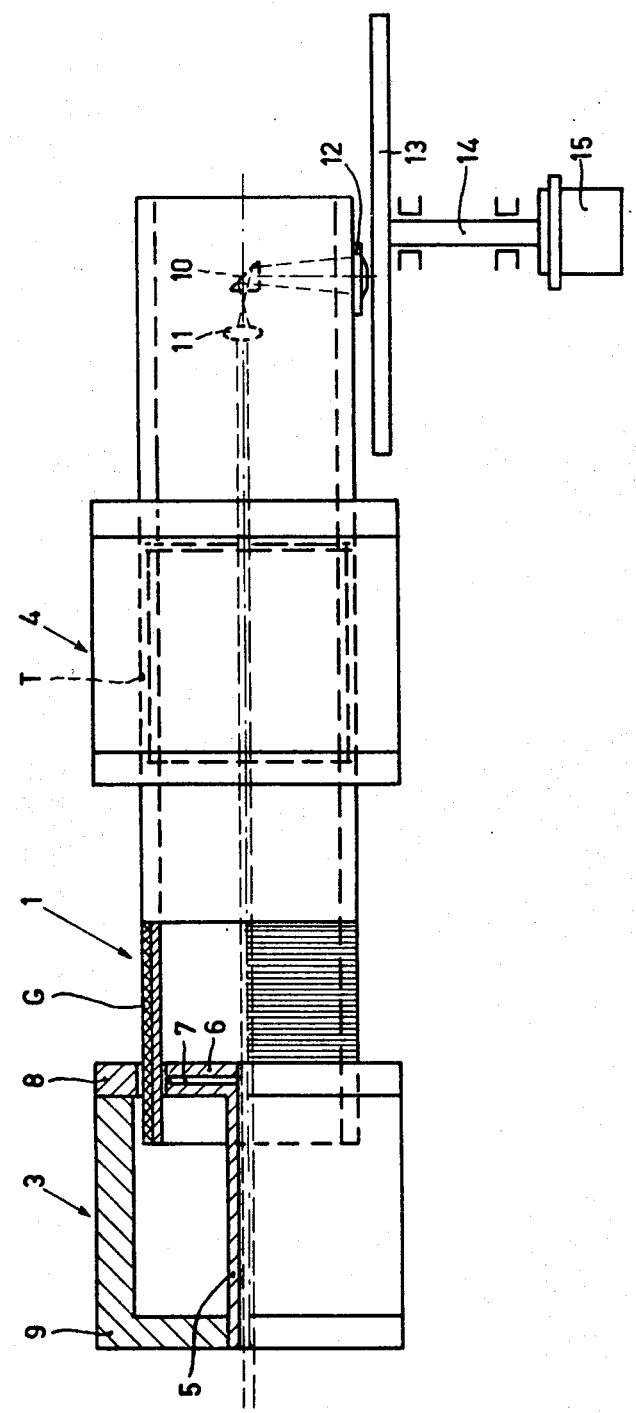
FIG. 2 shows the same device but with extended tubular member.

The tubular member 1 in FIG. 1 is provided with a drive coil G and a tachometer coil T. The member is movably disposed in the magnet systems 3 and 4, each consisting of a core 5, which in the present instance is hollow and at its end is provided with a pole shoe 6. The pole shoe 6 is provided with a number of ducts 7, through which a gas or fluid can be forced out and the tubular member 1 is borne by a gas or liquid cushion. The pole shoe 6 cooperates with a pole plate 8, which is connected to the other end of the core via a magnetic connection 9. Of course, it is also possible to dispose the ducts for the gas or the liquid in the pole plate 8, as is shown by the encircled detail. A reflecting element, in this case consisting of a prism 10, is disposed in the tubular member 1 which prism 10 via a lens system 11 reflects light from a light source along the axis of the tubular member through the hollow core 5 of the magnet system 3, to the transducer 12. The transducer 12 writes a track during recording, or reproduces a track during playback on a disk shaped record carrier 13, which via a shaft 14 is driven by a motor 15. As appears from FIG. 1, the distance between the record carrier and the tubular member is comparatively great and it is advantageous to select the embodiment of FIG. 2 in which the tubular member extends through the magnet system 4, so that the transducer 12 can be disposed closer to the tubular member, whereby oscillations therein have a minimal influence. FIG. 3 shows how the drive coil is energized by an output amplifier A, which receives its drive voltage from a differential amplifier D. To a first input of the differential amplifier D a reference voltage S is applied from a reference voltage source B, whose magnitude corresponds to the desired speed of displacement of the tubular member 1. The tacho-coil T supplies its voltage to a preamplifier P, which applies this voltage, via a correction filter F, to the second input of the differential amplifier D. Obviously, alternative control systems are possible, but these fall beyond the scope of the invention. Correction filter F compensates for the nonlinear response of the tachogenerator.

Although the length of the coil is greater than that of the pole shoe, it is of course equally possible to make the pole shoe so long that the complete coil is always located in a homogeneous magnet field.

What is claimed is:

1. A device for recording information on a rotating disk-shaped record carrier and/or for reading the recording from the carrier with a radiation beam, comprising a tubular member, a transducer on the tubular member in the path of the radiation beam, said radiation beam being projected through said tubular member in a direction substantially parallel to the longitudinal axis of said tubular member, means positioned within said tubular member for deflecting the radiation beam out of said tubular member through said transducer, a drive coil surrounding one end of said tubular member, a tacho-generator coil surrounding the other end of said tubular member and providing a tacho-generator signal in response to motion of the tubular member, a separate stationary magnetic system means magnetically coupled to each of said coils for providing a stationary magnetic field and an air gap surrounding each of said coils, a signal source for providing an energizing signal for said drive coil, and means for combining the tacho-generator signal with said energizing signal and for connecting said combined signal to said drive coil.

2. A device as claimed in claim 1, wherein the tubular member extends through the magnet system means and wherein the transducer is disposed at said one end.

3. A device as claimed in claim 1, wherein each of the magnet system means consists of a hollow core and is at one end provided with a cylindrical pole shoe, which together with a pole plate disposed opposite said pole shoe defines the air gap of each of said magnetic system means, and a magnetic connection provided between said plate and the other end of the core.

4. A device as claimed in claim 3, wherein the tubular member extends through the magnet system means and wherein the transducer is disposed at said one end.

5. A device as claimed in claim 3, wherein the pole shoe and/or the pole plate is provided with ducts which terminate in the air gap, through which a pressurised gas or liquid may flow out.

6. A device as claimed in claim 5, wherein the tubular member extends through the magnet system means and wherein the transducer is disposed at said one end.

* * * * *